J. O. GARMON.
SCALE.
APPLICATION FILED SEPT. 14, 1909.
988,185.
Patented Mar. 28, 1911.
2 SHEETS—SHEET 1.
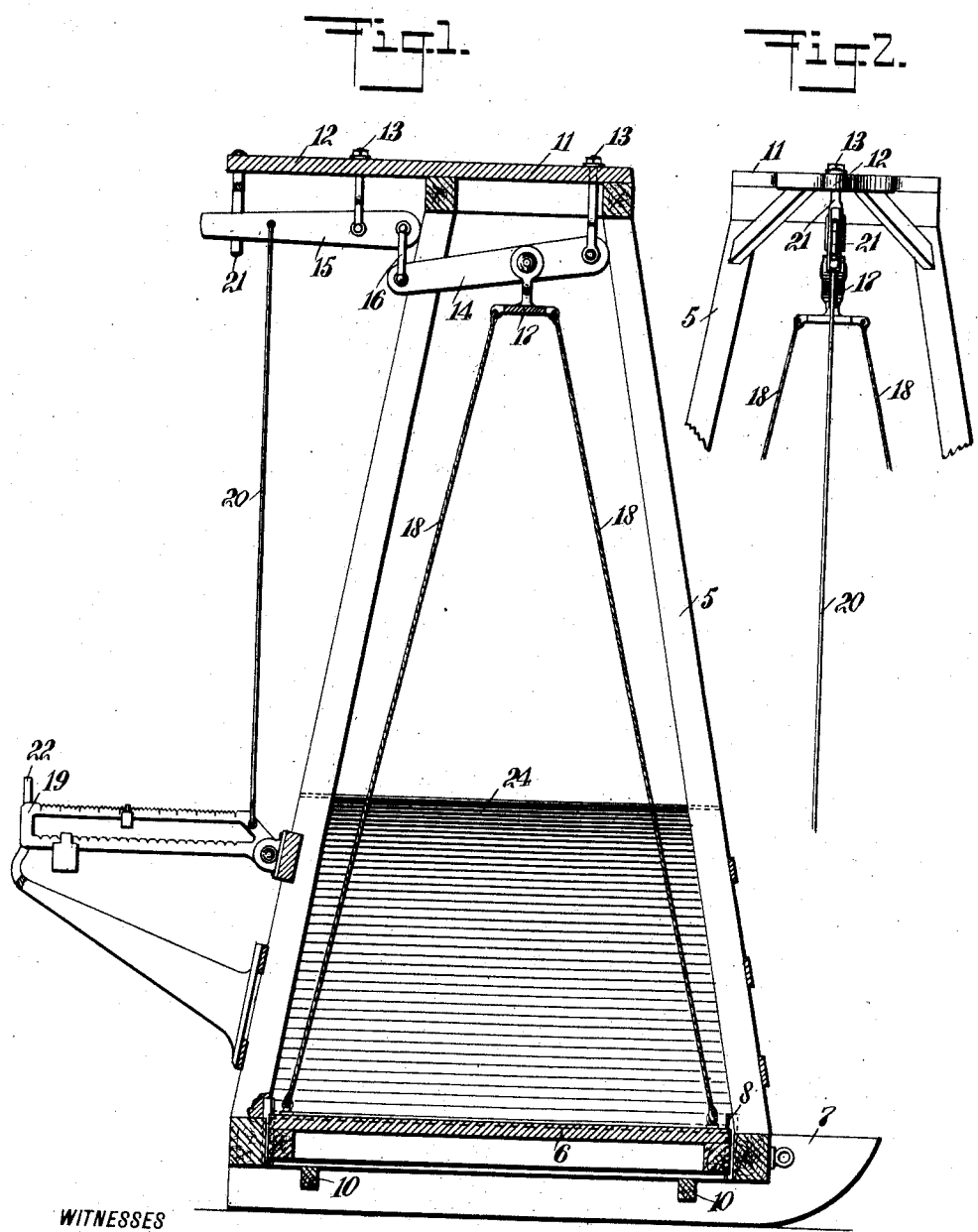
WITNESSES
INVENTOR
John Oscar Garmon
BY
ATTORNEYS J. O. GARMON.
SCALE.
APPLICATION FILED SEPT. 14, 1909.
988,185.
Patented Mar. 28, 1911.
2 SHEETS—SHEET 2.
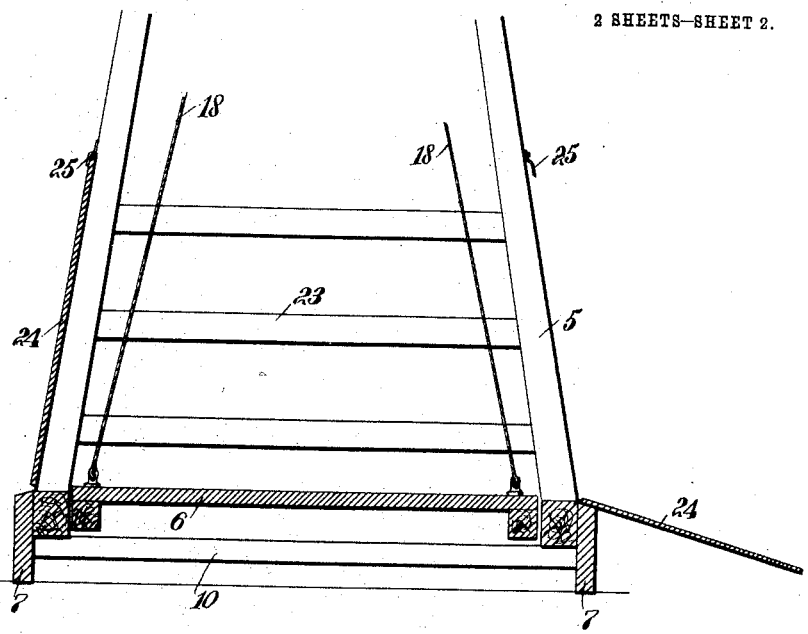
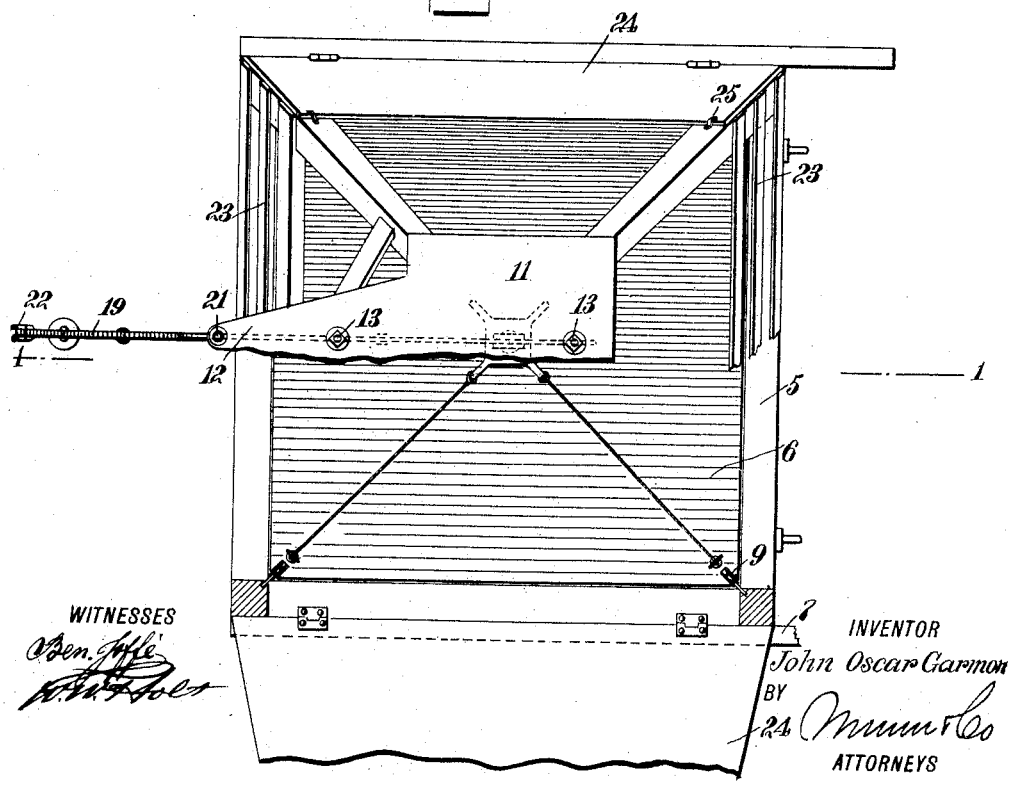
WITNESSES
INVENTOR
John Oscar Garmon
BY
ATTORNEYS

UNITED STATES PATENT OFFICE.

JOHN OSCAR GARMON, OF TROPICO, CALIFORNIA.

SCALE.

988,185.  Specification of Letters Patent.  Patented Mar. 28, 1911.

Application filed September 14, 1909. Serial No. 517,589.

*To all whom it may concern:*

Be it known that I, JOHN OSCAR GARMON, a citizen of the United States, and a resident of Tropico, in the county of Los Angeles and State of California, have invented a new and Improved Scale, of which the following is a full, clear, and exact description.

The invention is an improvement in scales designed more especially for farmers and merchants, for weighing feed, stock and other articles, and has in view a scale capable of being easily moved from place to place and in which the scale platform may be easily loaded and unloaded, and the platform rendered firm, if desired, during the loading and unloading operation. Further, to so arrange the weighing mechanism of the scale that no part will be located under the platform but in an accessible position for inspection, etc.

Reference is to be had to the accompanying drawings forming a part of this specification, in which similar characters of reference indicate corresponding parts in all the views.

Figure 1 is a central vertical section on the line 1—1 of Fig. 4, of a scale constructed in accordance with my invention; Fig. 2 is a side elevation of the upper portion of the scale; Fig. 3 is a vertical section of the lower portion of the scale at right-angles to the section shown in Fig. 1, showing one of the gates thrown down to provide an inclined skid to facilitate the loading of the scale platform; and Fig. 4 is a plan of the scale, with the tower broken away at one side and in section.

In the construction of my improved scale I provide a tower 5, preferably of pyramidal form, the base of the tower being open to receive a scale platform 6, and supported in a slightly elevated position on runners 7, the latter serving to admit of the scale being shifted from one place to another, while avoiding the possibility of the scale moving when loading and unloading the scale platform. In the corners of the base of the tower are vertical guides 8 engaged by grooved rollers 9 (see Fig. 2) journaled on the platform and operating to prevent the platform from tilting or swinging during the weighing operation. On the under side of the tower base are one or more cross-sills 10, preferably two, arranged at the sides, on which the platform is adapted to seat when dropped, and be thus rendered firm for loading and unloading the articles to be weighed.

The top of the tower is provided with a cap 11 having an arm 12 extended to overhang one side of the tower, the cap and its arm having hangers 13, preferably in the nature of Y-bolts, with the hanger of the cap proper pivotally connected to the inner end of a supporting lever 14, and the hanger of the arm likewise connected intermediate the length of an actuating-lever 15, the adjacent ends of the levers being operatively connected by a link 16. A hanger 17 is fulcrumed on the lever 14, centrally of the tower, and is connected to the corners of the platform by cables 18. A scale arm 19 is pivotally supported at its inner end to swing in a vertical plane and at a convenient elevation at one side of the tower, with the pivoted end of the scale arm operatively connected with the outer arm of the actuating lever 15 by a link 20, this lever and the scale arm being prevented from swinging sidewise, respectively by guides 21 and 22, the guide 21 depending from the outer end of the arm 12, and the guide 22 supported from the side of the tower. A scale arm 19 is provided with two weighing bars, the upper one serving to balance the platform when unloaded, and the other to determine the weight of the articles which are placed on the platform.

The sides of the tower for a substantial height are preferably latticed, as indicated at 23, and the entrance and exit to and from the platform closed when the scales are not in use, by gates 24, each gate being hinged at its lower edge to turn down to an inclined position to provide an inclined skid leading to the scale platform, with the inner end of the skid resting on the top edge of the adjacent runner. When the scale is not in use, the gate is turned up against the corner posts of the tower and secured by suitable latches 25.

In the use of the scale the lower weight on the scale arm is moved inwardly to the zero mark and the upper weight brought to a position where the scale platform is exactly balanced, and this point of the weight noted. The upper weight is then shifted inwardly to allow the scale platform to rest on the cross-sills 10, rendering the platform firm for loading on the articles to be weighed. With one or both of the gates 24 turned down, the scale platform may be easily loaded, and the articles weighed and removed. Ordinarily, one side of the scale will serve as an entrance and the other side as an exit, to and from the platform. In this way, swine and other stock may be passed to the scale and weighed with facility.

Having thus described my invention, I claim as new and desire to secure by Letters Patent:

1. The combination of a tower, a scale platform vertically movable within the tower, and gates independent of the platform and arranged at the opposite sides of the tower, movable to a position to provide skids leading to the platform.

2. The combination of a pyramidal tower having an open base, means supporting the tower, with the base thereof slightly elevated, a scale platform vertically movable within the open base of the tower, a scale arm, and a supporting lever operatively connected to the scale arm, having means connected thereto approximately centrally of the tower suspending the platform.

3. The combination of a pyramidal tower, a scale platform vertically guided in the base of the tower, a supporting lever fulcrumed at one end in the upper portion of the tower, a scale arm arranged at one side of the tower, an actuating arm fulcrumed intermediate its length at the upper portion and at one side of the tower and operatively connected at opposite sides of its fulcrum respectively to the supporting lever and to the scale arm, a hanger connected to the supporting lever centrally of the tower, and cable suspending the platform from the hanger.

In testimony whereof I have signed my name to this specification in the presence of two subscribing witnesses.

JOHN OSCAR GARMON.

Witnesses:
   JOSEPH HARTMAN,
   HENRY F. GARMON.

---

Copies of this patent may be obtained for five cents each, by addressing the "Commissioner of Patents, Washington, D. C."